No. 759,718. PATENTED MAY 10, 1904.
E. KAYE.
METHOD OF MANUFACTURING GLASSWARE.
APPLICATION FILED JULY 17, 1903.
NO MODEL.
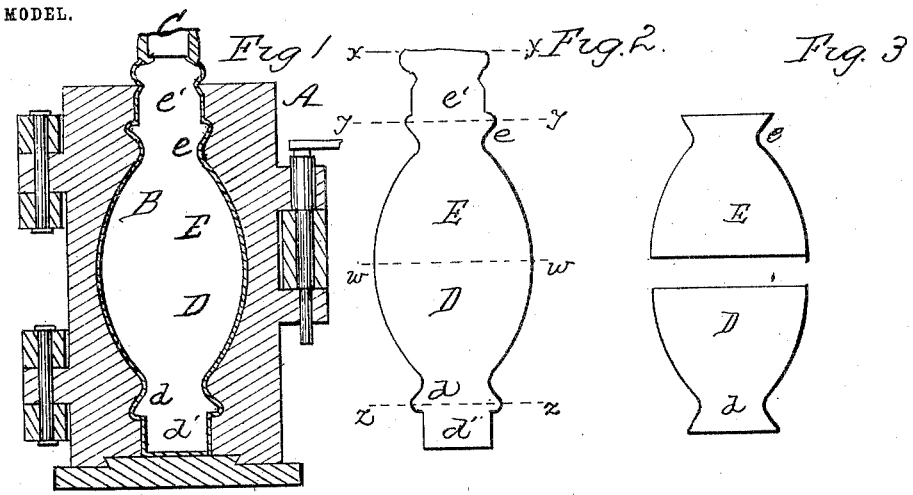
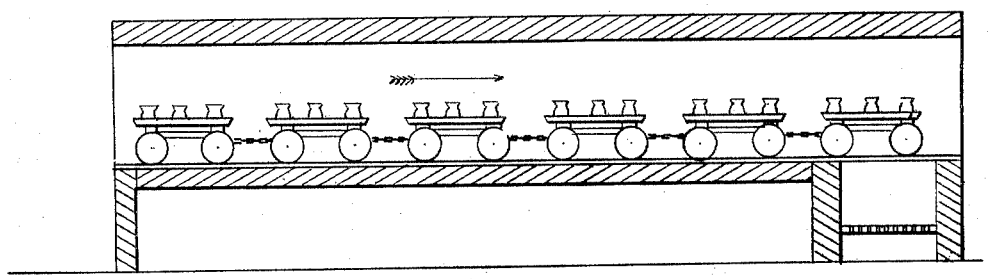

No. 759,718. Patented May 10, 1904.

UNITED STATES PATENT OFFICE.

EDWARD KAYE, OF MONACA, PENNSYLVANIA.

METHOD OF MANUFACTURING GLASSWARE.

SPECIFICATION forming part of Letters Patent No. 759,718, dated May 10, 1904.

Application filed July 17, 1903. Serial No. 166,016. (No specimens.)

*To all whom it may concern:*

Be it known that I, EDWARD KAYE, a citizen of the United States of America, and a resident of Monaca, in the county of Beaver and State of Pennsylvania, have invented certain new and useful Improvements in Methods of Manufacturing Glassware, of which the following is a specification.

My invention has relation to the manufacture of glassware, and has for its object the provision of a novel method whereby the number of articles produced by a given number of workmen may be made of a quality equal to regularly-blown ware at a cost not in excess of the cost of inferior grades of pressed ware.

In carrying my invention into effect I proceed as follows: A quantity of glass is gathered and manipulated in the usual way and blown into a mold of such shape that the blown glass embodies two or more articles united together, each such article having a finished part. The blown glass is then knocked off the blowpipe and while the several articles are still united is conveyed to a leer and annealed. The articles are then separated by cracking them apart on the line of juncture and placed in a suitable heating-furnace and heated up to a point where they can be safely reheated at a glory-hole, and after they have been there heated to a suitable degree they are fashioned to the desired shape.

In the accompanying drawings, Figure 1 is a vertical sectional view of a mold adapted to form the articles two at a time in a finished or partly-finished condition. Fig. 2 is a side view of the articles so produced before being annealed and cracked off. Fig. 3 is a side view of the two articles when cracked apart. Fig. 4 is a vertical sectional view of a furnace for heating the articles after they have been cracked apart, and Figs. 5 and 6 are side views of forms of articles made from the two parts shown in Fig. 3.

A designates the mold, and B the glass which has been blown in the same to the shape shown by means of the blowpipe C. The two sections D E of the glass, which are shown in the mold A in one piece, are designed when separated to be formed into two lamp-shades, and the "fitter," or that part which is held by the gas-fixture, is formed in its completed shape, as shown at $d\ e$ in the mold, while the part E has a part $e'$, that connects it with the blowpipe, and the part D has a bottom piece $d'$, that is cracked off after the glass has been removed from the mold, as will be presently described. After the glass has been blown in the mold A, which is accomplished in the usual manner, the mold A being either a still-mold or a twist-mold, the mold is opened and the glass removed and knocked off the blow-pipe at the line $x\ x$. The glass is then conveyed to a leer and properly annealed and after being annealed is cracked off on the lines $w\ w$, $y\ y$, and $z\ z$, leaving the two parts shown in Fig. 3. It will thus be seen that the cracking-off operation just described has left two parts, each of which has a finished fitter or portion adapted to be clasped by the gas-fixture to hold the shade in position, and these two parts, which now constitute separate and independent articles, are conveyed to the furnace, (shown in Fig. 4,) where they are heated up to a degree that renders it safe to still further heat them at a glory-hole, at which the edges and as much of the body as it is desired to fashion to a different shape are heated to the required degree, when the articles are then worked to any desired form, as by placing them on a crimper or by manipulating them by hand with suitable tools, after which they are again conveyed to the leer and annealed.

If it be desired to maintain the shape given to the articles in the first mold in which they are blown, the unfinished edge which is left when they are cracked off on the line $w\ w$ is merely glazed or fire-finished at the gloryhole after the articles have been reheated, as above described; but it is obvious that the shape of the article may be varied to any required degree after they have been heated at the glory-hole, and I have shown in Figs. 5 and 6 two completed articles made from the parts shown in Fig. 3, the one shown in Fig. 5 having been formed by pressing the glass down on a crimping-block and the other, shown in Fig. 6, having been produced by spreading the glass in the manner well understood by glass-workers.

From the above description it will be seen that the part which is blown in the mold in the first instance is capable of being transformed into two differently-shaped articles or into two which are of the same shape as may be desired. The saving thus effected is not only that of the wages of one blower, but of all of his assistants, and the output of the factory will be equal, so far as the blowing department is concerned, to that of a factory employing twice as many hands.

Having described my invention, I claim—

1. The method of manufacturing glassware, consisting in blowing a form with two or more finished portions, then annealing the form, then cracking it off to produce two or more separate articles, then reheating the articles and forming them to final shape.

2. The method of manufacturing glassware, consisting in blowing a mass of glass in a mold to a shape embodying two or more attached articles, then removing the glass from the mold and annealing it, then cracking off the articles, then simultaneously reheating the separate articles and then fashioning them to the desired shape and then again annealing the articles.

3. The method of manufacturing glassware, consisting in blowing a form with two or more finished portions, then annealing the form, then cracking it off, to produce two or more separate articles, then gradually and simultaneously reheating a plurality of the articles in a reheating-furnace and then further heating them severally at a glory-hole and forming them to final shape.

Signed at Monaca this 8th day of December, 1902.

EDWARD KAYE.

Witnesses:
N. WURZEL, Jr.,
ANDREW HOWARD.